United States Patent
Preibisch et al.

(10) Patent No.: US 9,462,044 B1
(45) Date of Patent: Oct. 4, 2016

(54) SECURE USER, DEVICE, APPLICATION REGISTRATION PROTOCOL

(71) Applicant: CA, Inc., Islandia, NY (US)

(72) Inventors: Sascha Preibisch, Richmond (CA); Mike Lyons, Vancouver (CA); Anthony Peiqun Yu, Richmond (CA); Francois Lascelles, Kelowna (CA); Kenneth William Scott Morrison, New Westminster (CA)

(73) Assignee: CA, INC., New York, NY (US)

( * ) Notice: Subject to any disclaimer, the term of this patent is extended or adjusted under 35 U.S.C. 154(b) by 0 days.

(21) Appl. No.: 14/088,847

(22) Filed: Nov. 25, 2013

(51) Int. Cl.
*H04L 29/06* (2006.01)
*H04L 29/08* (2006.01)

(52) U.S. Cl.
CPC ........... *H04L 67/10* (2013.01); *H04L 63/0428* (2013.01)

(58) Field of Classification Search
CPC ............................ H04L 67/10; H04L 63/0428
USPC ........................................................ 713/168
See application file for complete search history.

(56) References Cited

U.S. PATENT DOCUMENTS

| | | | |
|---|---|---|---|
| 2011/0145891 A1* | 6/2011 | Bade et al. | 726/4 |
| 2012/0173610 A1* | 7/2012 | Bleau et al. | 709/203 |
| 2012/0303951 A1* | 11/2012 | Medvinsky et al. | 713/157 |
| 2013/0072153 A1* | 3/2013 | Lawson et al. | 455/410 |
| 2014/0258368 A1* | 9/2014 | Suryavanshi et al. | 709/203 |

\* cited by examiner

*Primary Examiner* — Mohammad W Reza
(74) *Attorney, Agent, or Firm* — Vierra Magen Marcus LLP

(57) ABSTRACT

A secure protocol for registering a user, device and application with a computing device, such as a server, is provided. The protocol uses a single sign-on or registration request that enables multiple applications executing on single mobile computing device to access server resources' without each application separately registering with the server. After registration, a server is able to determine which user is using which application on which computing device whenever a request is sent from a device to the server. This type of registration enables fine grained access control to protected resources, such as information and/or services, of the server.

18 Claims, 9 Drawing Sheets

SECURE USER, DEVICE, APPLICATION REGISTRATION PROTOCOL

BACKGROUND

The present disclosure relates to communicating between computing devices, and in particular registering a user, device and application with a server computing device.

Computing devices, such as a mobile computing device, may control or enable certain access to external devices. For example, a cellular telephone may control whether the cellular telephone may also join a local wireless network. A control panel may enable the user to join or not join the local wireless network that may have access to the Internet. Other external interfaces may be similarly controlled by a user.

When computing devices request information or services from a remote computing device or server, a server may need to be aware of the requesting computing device before any information or services is provided.

BRIEF SUMMARY

According to one aspect of the present disclosure, a secure protocol for registering a user, device and application with a computing device, such as a server, is provided. In an embodiment, the protocol uses a single sign-on or registration request that enables multiple applications executing on single mobile computing device to access server resources' without each application separately registering with the server. After registration, a server is able to determine which user is using which application on which computing device whenever a request is sent from a device to the server. This type of registration enables fine grained access control to protected resources, such as information and/or services, of the server.

According to another aspect of the disclosure, a protocol or method for registering a first and second application with a server is provided. Registration information, such as user credentials, for the first application is output from the computing device to the server. Information that indicates that the first application has access to the server, such as a signed certificate or JSON Web Token (JWT), is received and stored. First information (or a service) from the server is requested and received by the first application. The second application then requests second information (or another service) from the server using at least the information that indicates that the first application has access to the server. The second application receives second information from the server without outputting registration information for the second application to the server.

According to another aspect of the disclosure, an apparatus comprises a processor and a computer readable storage medium to store a first application having computer readable program code and a second application having computer readable program code. The processor executes the computer readable program code to: 1) prompt a user for registration information and receive the registration information from the user; 2) provide a request to register the first application with a server computing device, the request including at least the registration information; 3) receive an indication that the first application is registered with the server computing device, such as a signed certificate; 4) request first information, by the first application, from the server processing device; 5) receive the first information, by the first application, from the server computing device; 5) request second information, by the second application, from the server processing device using the indication that the first application is registered; and 6) receive the second information, by the second application, from the server processing device without having prompting a user for registration information.

According to another aspect of the disclosure, a computer program product comprises a computer readable storage medium having computer readable program code embodied therewith. The computer readable program code comprises: 1) computer readable program code configured to provide a first application; 2) computer readable program code configured to provide a second application; 3) computer readable program code configured to provide a first private key chain for the first application; 4) computer readable program code configured to provide a second private key chain for the second application; and 5) computer readable program code configured to provide a shared key chain for the first and second applications. The computer readable program code for the first application generates a private key and a certificate signing request. The computer readable program code for the first application also outputs the certificate signing request to a server. The computer readable program code for the first application then receives and stores a signed certificate and a device-identifier in the computer readable program code configured to provide a shared key chain.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
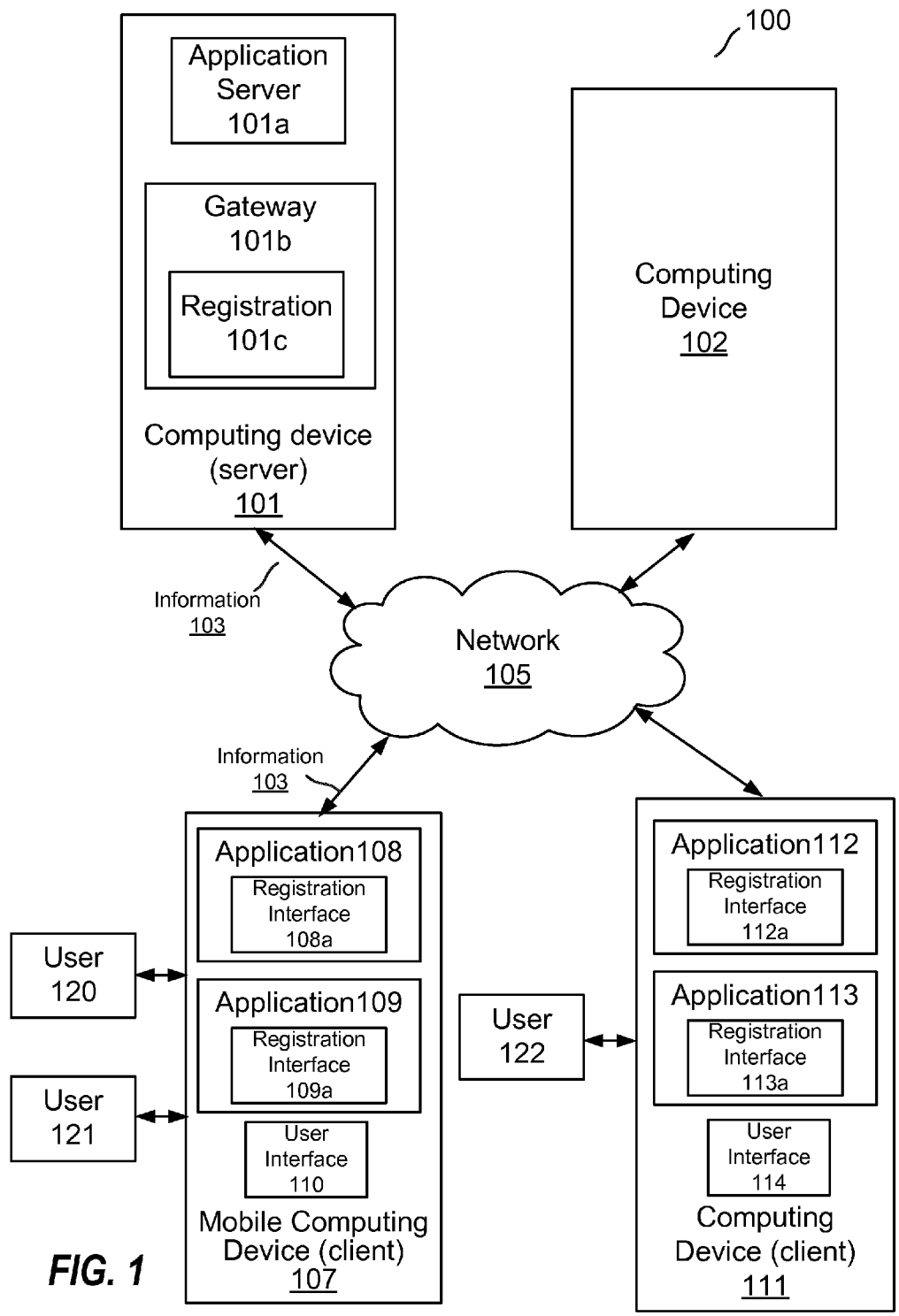
FIG. 1 illustrates a high-level block diagram of an apparatus or system comprising networked computing devices using a secure user, device application registration protocol according to an embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated signal with computer readable program code embodied therein, for example, in baseband or as part of a carrier wave.

Propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer (or computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations, sequence diagrams and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Similarly, each arrow of a sequence diagram may likewise be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart, sequence diagram and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a high-level block diagram of an apparatus (or system) 100 comprising networked computers (or computing devices) that use a protocol to register a plurality of applications that may access a plurality of services provided by a server with a single sign on or registration request. After registration the server is able to determine which user is using which application on which computing device whenever a request is sent from a computing device to the server. This type of registration enables fine grained access control to protected resources.

In an embodiment, computing device 107 communicates with computing device 101 located at a remote physical location by way of network 105 as described herein. Computing device 101 is considered external to computing device 107 in an embodiment. In an embodiment, user 120 (and in another embodiment user 121 also) may want to register applications 108 and 109 with application server 101a executing on computer device 101. Gateway 101b includes registration 101c that registers or determines which users, devices and applications have access to services provided by application server 101a.

In an embodiment, computing device 101 may be a server having computer programming code, such as application server 107a and gateway 101b, and computing device 107 may be a client of computing device 101. In another embodiment, computing devices 101, 102, 111 and 107 are peers. In a peer-to-peer (P2P) embodiment of computing devices 101, 102, 111 and 117, each computing device may act as a client or a server of the other.

Computing devices 101 and 107 may communicate by way of network 105 as described herein. In further embodiments, computing device 111 communicates with computing devices 101 and 107 by way of network 105. In an embodiment, network 105 may be the Internet, a Wide Area Network (WAN) or a Local Area Network (LAN), singly or in combination. In embodiments, computing devices 101, 107, 102 and/or 111 use one or more protocols to transfer information, such as Transmission Control Protocol/Internet Protocol (TCP/IP). In embodiments, computing device 107 is included in another network. Information may be transferred between computing devices by wire and/or wirelessly in network 105.

In alternate embodiments, apparatus 100 includes many more or less computing devices and/or servers/clients to provide and receive information. In an embodiment, computing devices 101 and 102 are servers providing information, such as information 103, to computing devices 107 and 111 that act as clients. In alternate embodiments, computing device 107 is a mobile computing device such as a cell phone, laptop computer, notebook or tablet that has multiple users 120-121 (or a single user in an embodiment) and computing device 111 is embedded system, laptop or desktop computer having a single user 122 (or multiple users in an embodiment). In an embodiment, computing devices 101 and 102 may be a server and/or datacenter.

In an embodiment, a user, such as user 120 uses user interface 110 and registration interface 108a to register computing device 107 with computing device 101. In particular, user 120 registers both applications 108 and 109 with application server 101a using a single sign on request, rather than registering each application separately. Register interface 108a in application 108 uses a protocol with gateway 101b, and in particular registration 101c, to register the multiple applications with a single sign on. A single sign on may include providing user, device and application credentials for registration 101c to authenticate. Once registered, applications 108 and 109 may access the resources or services of application server 101a. In an embodiment, registration interface 109a may likewise register application 109 and 108. Similarly, user 122 may use user interface 114 along with registration interfaces 112a and 113a in applications 112 and 113 to register applications 112 and 113 with application server 110a. In embodiments, applications 108-109 and 112-113 along with user interface 110 and 114 are computer program code.

In an embodiment, user interface 110 and 114 include natural language interfaces where a user may speak, touch or gesture to user interface 110 and 114 to provide input. Similarly, user interfaces 110 and 114 may output images, characters, speech and/or video as an output in an embodiment.

In an embodiment, registration interfaces 108a-109a and 112a-113a are computer program code that includes a software development kit (SDK) which may include one or more libraries of programs for accessing gateway 101b. In embodiments, applications 108-109 and 112-113 use application program interfaces (API) to access application server 101a. In an embodiment, an API is a library that includes specifications for routines, data structures, object classes, and variables.

Figure 2:
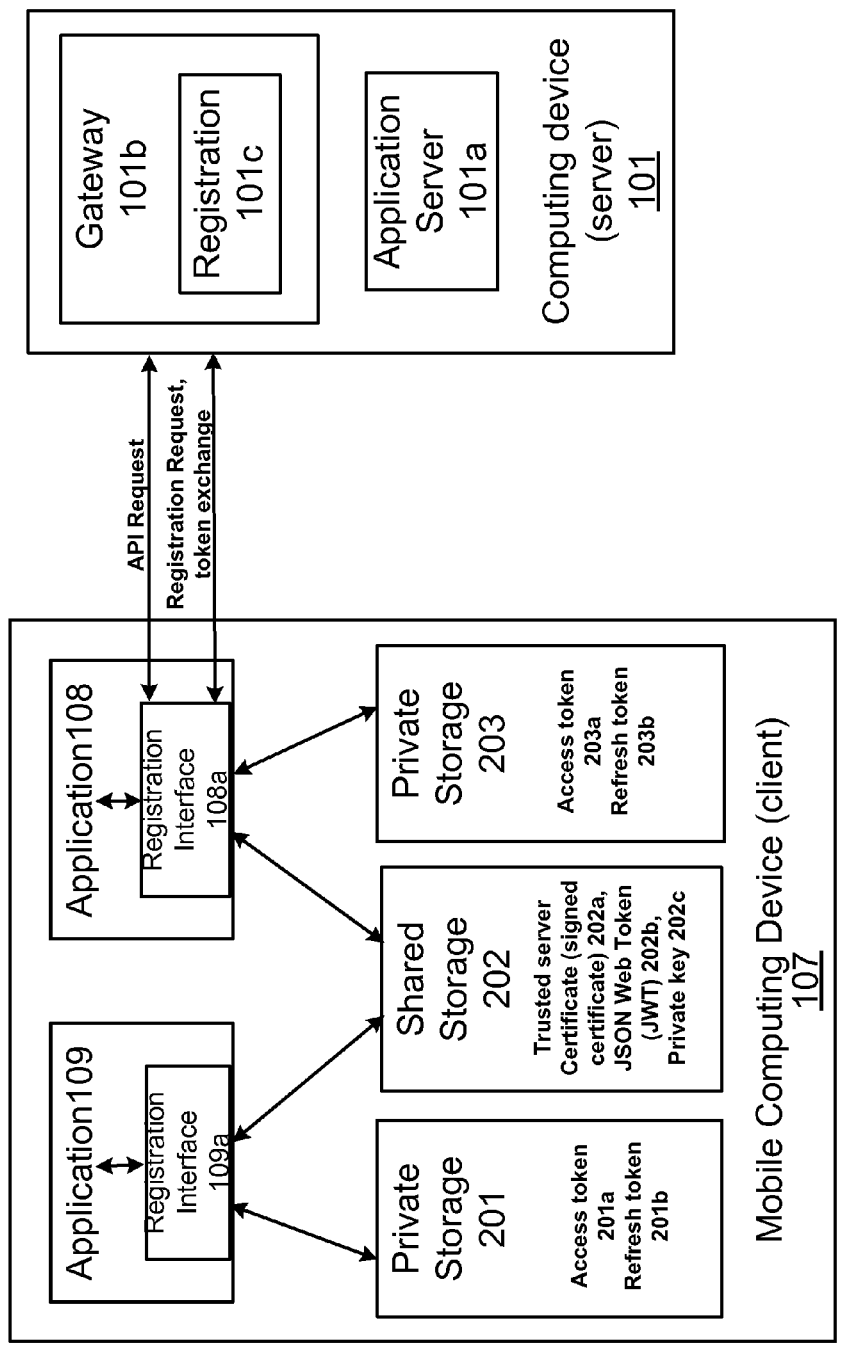
FIG. 2 illustrates a use and storage of tokens, certificates and keys for a protocol according to an embodiment.

FIG. 2 illustrates a use and storage of tokens, certificates and keys for a registration protocol according to an embodiment. Before one of applications 108-109 requests service or information from application server 101a, a registration protocol including a token exchange as described in detail herein occurs between computing device 107 and 101.

Access token 201a and refresh token 201b are stored in private storage 201 and are used by application 109 to enable access to application server 101a. Similarly, access token 203a and refresh token 203b are stored in private storage 203 and are used by application 108 to enable access to application server 101a. In an embodiment, private storages 201 and 203 may be considered private key chains or a set of private encryption information in embodiments. In an embodiment, access tokens and refresh tokens are used per an open standard for authorization (OAuth protocol).

Trusted server certificate 202a, JavaScript Object Notation (JSON) Web Token (JSON Web Token (JWT)) 202b and private key 202c are stored in shared storage 202 and used by both applications 108 and 109 as described in detail herein. In an embodiment, shared storage 202 is considered a public key chain or a set of public encryption information. JSON is an open standard format that uses human-readable text to transmit data objects consisting of key value pairs.

Figure 3:
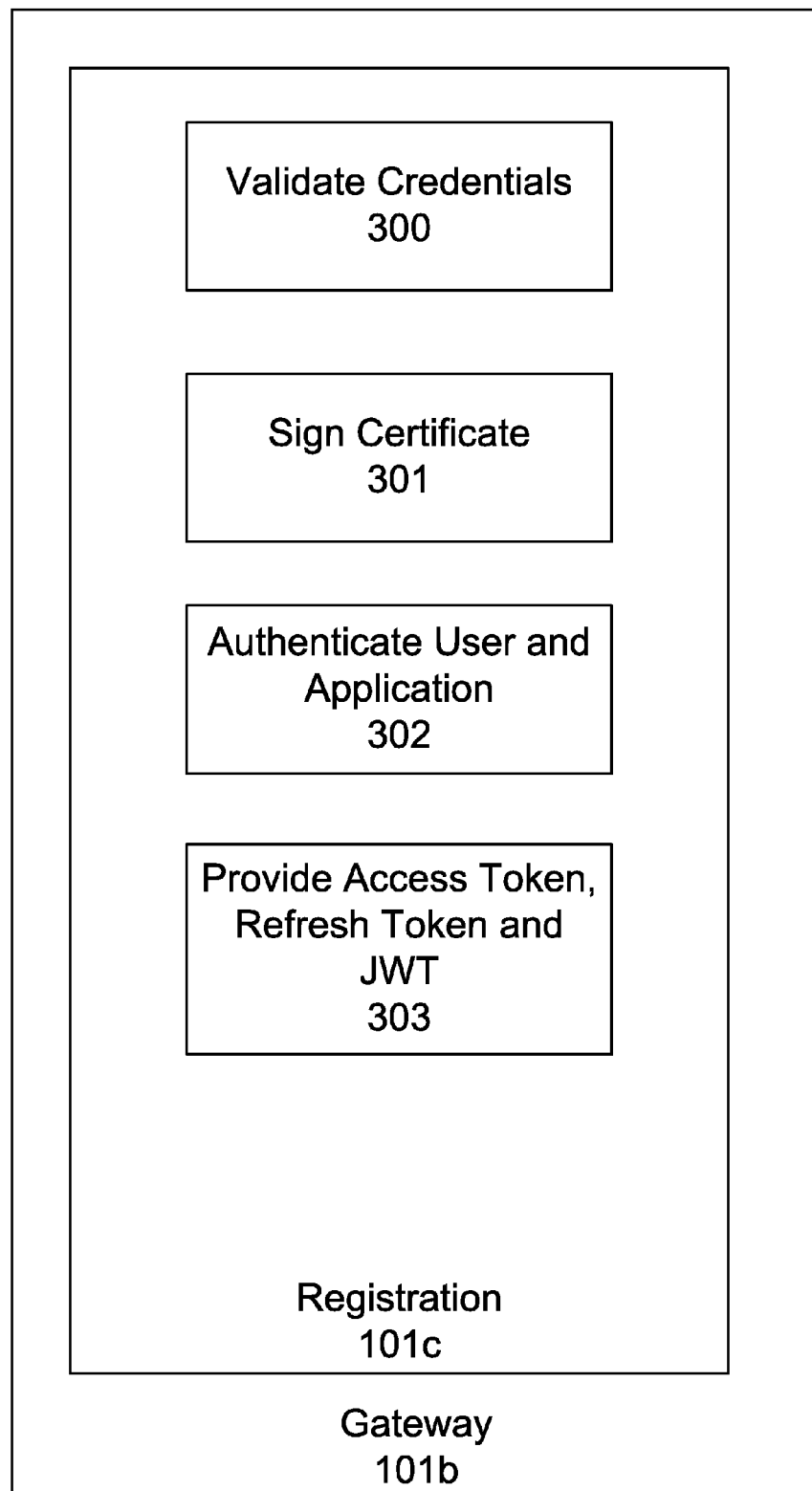
FIG. 3 illustrates a software architecture for a gateway executed on a server computing device according to an embodiment.

FIG. 3 illustrates a software architecture for a gateway, in particular registration 101c, executed on a server computing device. In an embodiment, registration 101c includes validate credentials 300, sign certificate 301, authenticate user and application 302 and provide access token, refresh token and JWT 303, one or more being computer program code.

Validate credentials 300 is responsible for validating user's credentials provided by a user having a computing device with an application that will request a service or resource from application server 101a. In an embodiment, a user's credential may include at least a user name, password and device name.

Sign certificate 301 is responsible for signing and outputting a signed certificate that has been requested by an application.

Authenticate user and application 302 is responsible for authenticating a user and/or application that may request a service or a resource from an application server, such as application server 101a.

Provide access token, refresh token, and JWT 303 is responsible for providing access token, refresh toke and JWT to a computing device in a protocol as describe herein.

Figure 4:
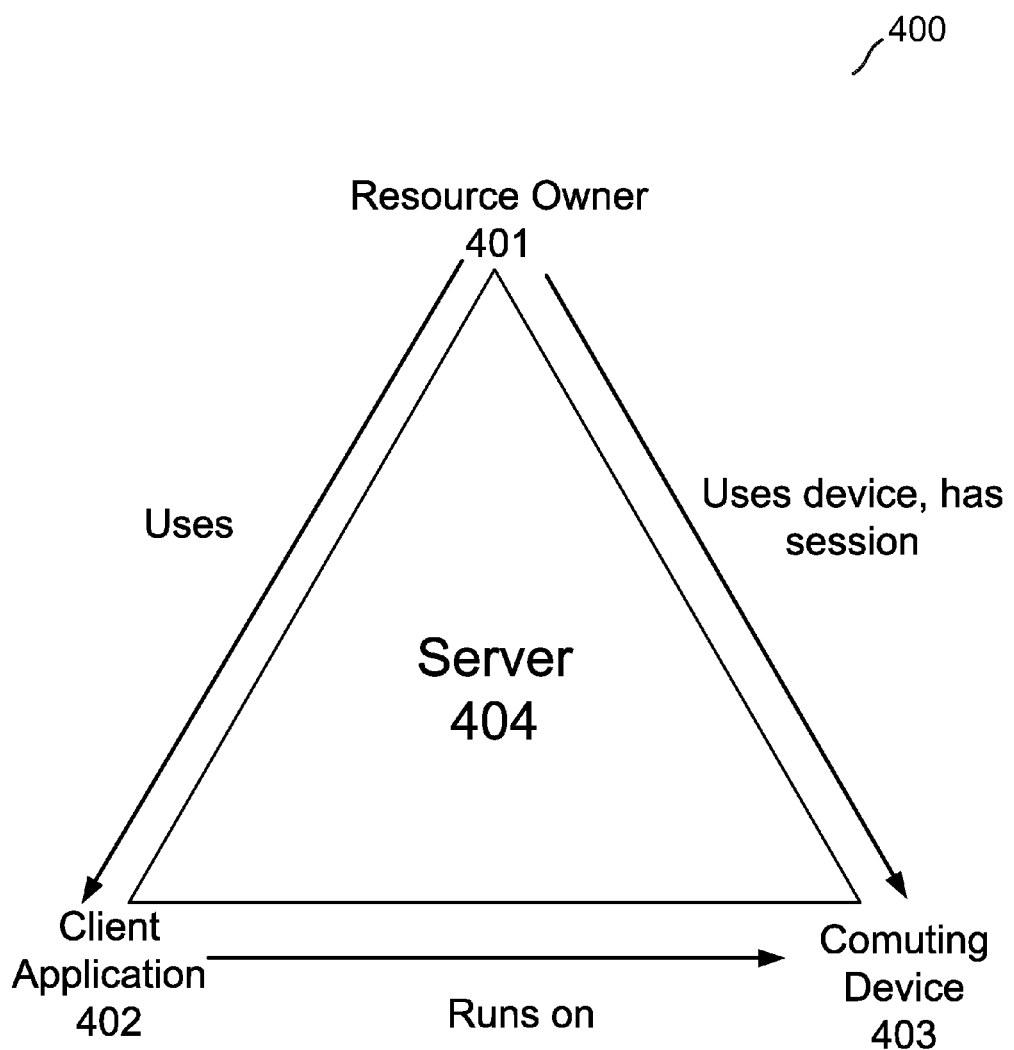
FIG. 4 illustrates relational information between a resource owner, computing device and application that a server has after registration according to an embodiment.

FIG. 4 illustrates relational information 400 between a resource owner, computing device and application that a server 404 has after registration according to an embodiment. In particular after a user registers an application executed on a particular computing device using a protocol as described herein, a server 404, such as application server 101a knows the specific relationships between a resource owner 401 (such as user 120), client application 402 (such as application 108) and computing device 403 (such as mobile computing device 107) at particular times. A server 404 knows which resource owner 401 uses which client application 402 (or applications). A server 404 also knows what particular client application 402 runs or is executed on what particular computing device 403. Similarly, a server 404 knows what resource owner 401 uses a particular computing device 403 or has a particular session.

With the relational information 400, a server may offer greater control of server resources or service to particular classes of resource owners, client applications, computing devices, singly or in combination thereof. For example, a server may offer one set of services for client application 402 when an application is used by a particular resource owner 401 on a particular computing device 403. However, a different set of services may be provided when a different user operates computing device 403 but still uses client application 402 is used. Other permutations of different resource owners or users using particular client applications on particular computing devices may results in a server providing different services or controls.

Figure 5:
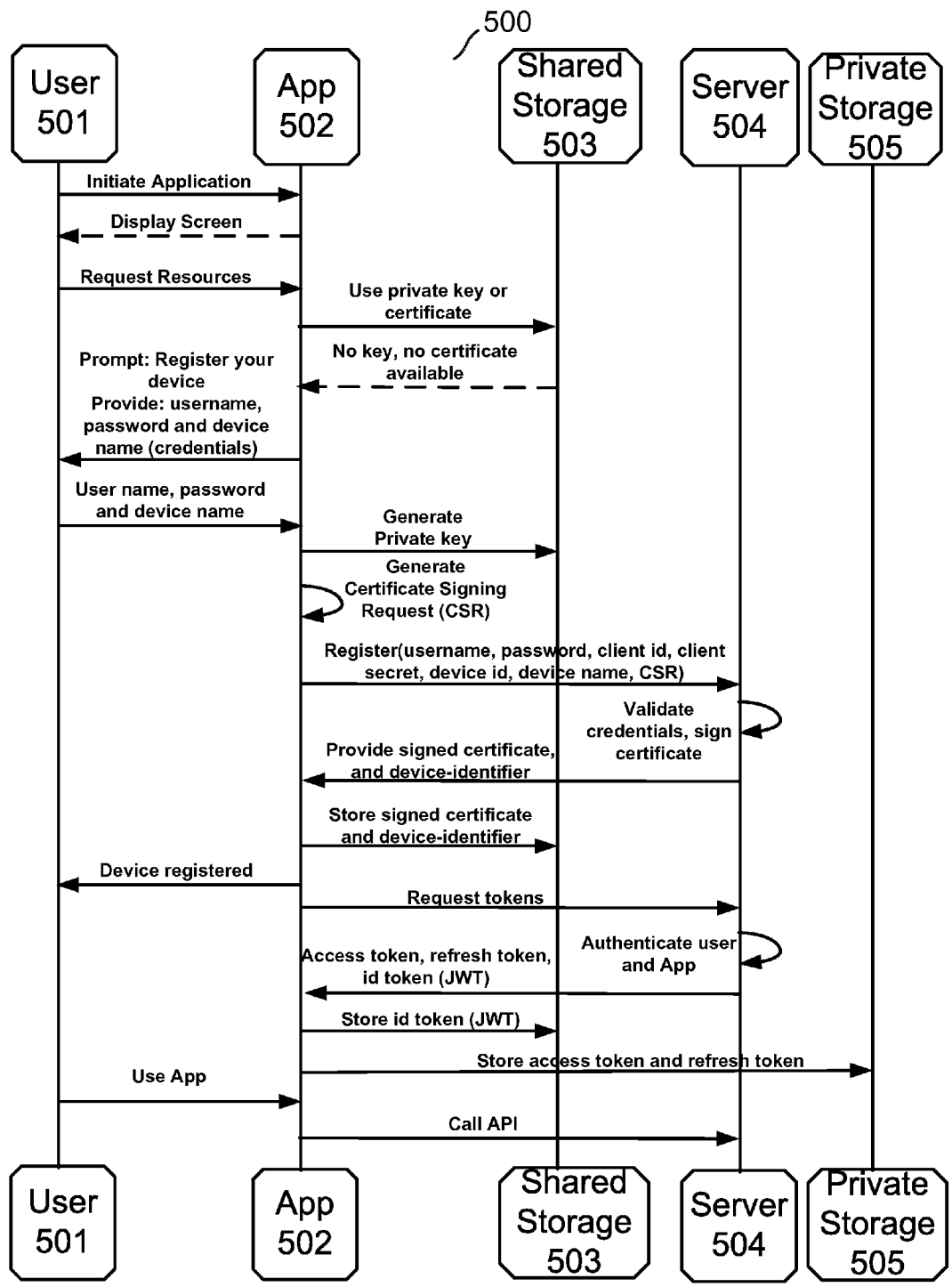
FIG. 5 is a sequence diagram that illustrates a protocol for registering a user, application and computing device with a server computing device according to an embodiment.

FIG. 5 is a sequence diagram 500 that illustrates a protocol for registering a computing device with a server computing device according to an embodiment. In an embodiment, registering a computing device with a server computing device enables the server computing device to recognize and provided services or resources to registered computing device and/or application. Registering a computing device with a server computing device refers generally to providing information regarding a user, computing device and/or application such that the server computing device will provide requested services.

FIG. 5 begins by a user 501, such as user 120, initiating (or starting) an application (App) 502, such as application 108 shown in FIG. 1. In an embodiment, a user 501 may select, command by speech or touch an icon representing application 502 on a touchscreen or other user input device. A page or voice of Application 502 is then displayed or output to user 501 as illustrated by a dotted line from application 502 to user 501. User 501 then may request resources or services from a server associated with application 502. For example, application 502 may be a brokerage application and user 501 may request an update of an account balance or stock quote from a server that stores stock quotes and account balances associated with the brokerage application. User 501 may select an account balance button or icon in a display window or screen provided by application 502.

Before requesting services or resources, an application 502 checks to see if a private key or trusted server certificate (signed server certificate) is stored in shared storage, such as shared storage 202 illustrated in FIG. 2. When no signed server certificate or private key is stored in shared storage 202 as illustrated by a dashed arrow from shared storage 503 to application 502, application 502 prompts user 501 to register their device and provide a username, password and device name (user credentials). Application 502 may prompt a user to input user credentials by providing a window or screen for a user to enter or input the requested information. In an alternate embodiment, application 502 may ask by way of voice for the requested information or user credentials.

A private key associated with the user credentials is generated and stored in shared storage 503 by application 502. A certificate signing request (CSR) is then generated by application 502 as illustrated by curved a curved arrow from application 502 to application 502.

A request to register a user, device and/or application is then provided by application 502 to server 504, such as computing device server 101 illustrated in FIG. 1. The request to register a user, device and/or application may include user credentials, client-identifier, client secret, device id and a CSR. In an embodiment, a CSR may include information that each application should register or obtain user credentials rather having a first application prompt and receive user credentials for a class of multiple applications.

Server 504 may then validate the user credentials and sign a certificate as illustrated by curved arrow from server 504 to server 504. In an embodiment, server 504 validates user credentials using validate credentials 300 shown in FIG. 3 and signs a certificate using sign certificate 301 shown in FIG. 3. In an embodiment, validate credentials 300 compares received user credentials with stored user credentials in order to validate the received user credentials.

A signed certificate (or trusted server certificate) and device-identifier is then provided by server 504 to application 502 which stores the signed certificate and device-identifier in shared storage 503. Application 502 then notifies user 501 that the device is registered as indicated from the arrow from application 502 to user 501.

Tokens for having a session between application 502 and server 504 are requested as illustrated by the arrow from application 502 and server 504. In an embodiment, the request includes a device-identifier, OAuth parameters, username and password, client-identifier, client secret and grant type.

Server 504 then authenticates the user and application as illustrated by curved arrow from server 504 to server 504.

Access tokens, refresh tokens and JWT are provided from server 504 to application 502 as illustrated by an arrow from server 504 to application 502. JWT is stored in shared storage 503 by application 502 while the received access token and refresh tokens are stored in private storage 505 associated with application. 501. In an embodiment, private storage 505 corresponds to private storage 201 and shared storage 503 corresponds to shared storage 202 shown in FIG. 2.

User 501 now may use application 502, as illustrated by an arrow from user 501 to application 502, which may use an API to obtain a resource or service from server 504, as illustrated by an arrow from application 502 to server 504.

Figure 6:
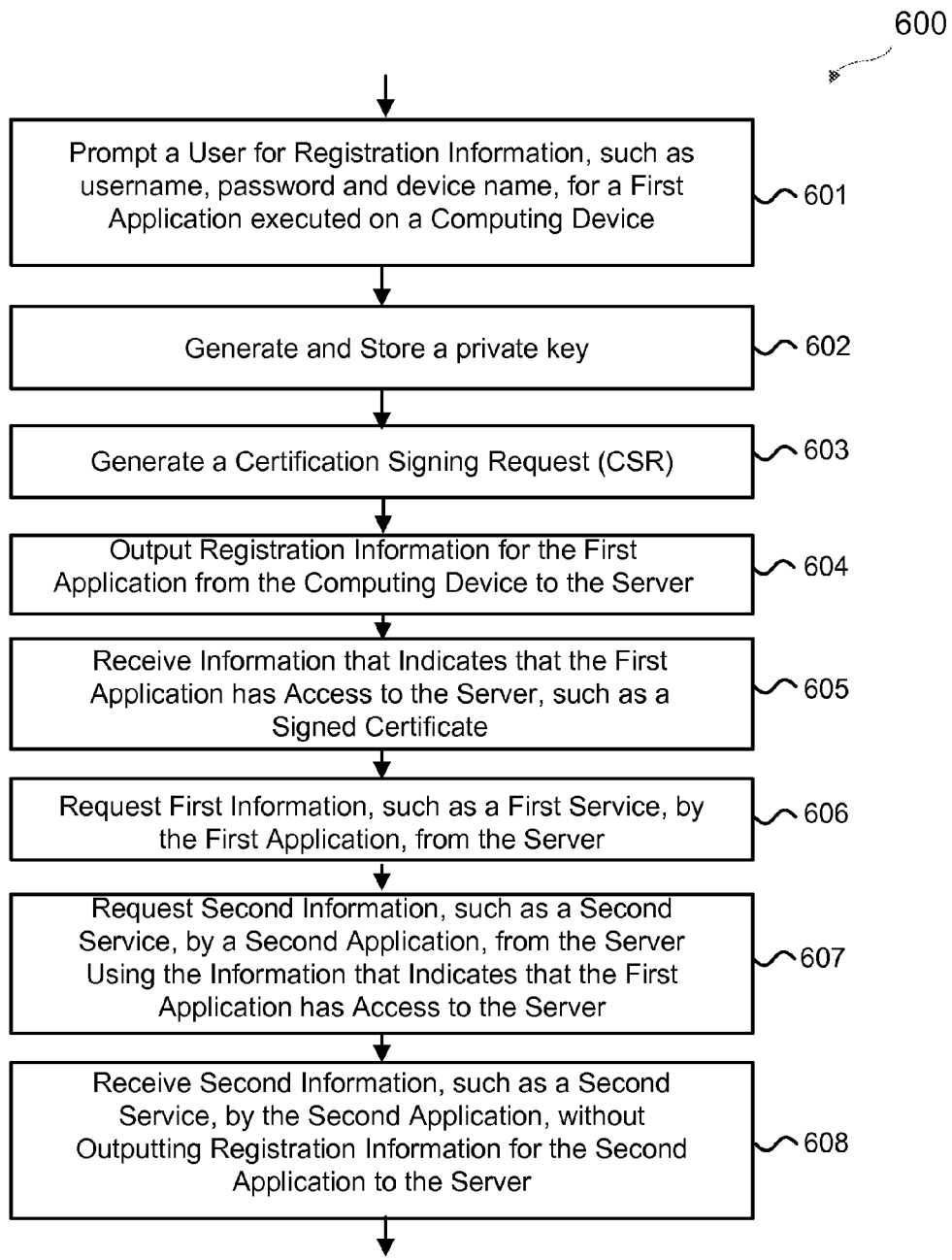
FIG. 6 is a flowchart illustrating a protocol for registering a user, application and computing device with a server computing processing device according to an embodiment.

FIG. 6 is a flowchart illustrating a protocol or method 600 for registering a computing device (and/or application/user) with a server computing processing device according to an embodiment. In particular, FIG. 6 illustrates a single sign on or registering multiple applications with a server computing processing device while obtaining registration credentials, such as user name, password and device name, from a first application in a class or plurality of similar applications.

Logic block 601 illustrates prompting a user for registration information, such as user (registration) credentials for a first application executing on a computing device. In an embodiment, application 108 with user interface 110 prompts a user 120 for user credentials.

Logic block 602 illustrates generating and storing a private key. In an embodiment, a private key is private encryption information stored in private storage, such as private storage 203 illustrated in FIG. 2. In an embodiment, private storage 203 stores a set of private encryption information or a private key chain.

Logic block 603 illustrates generating a CSR for a server having first information or a service that will be requested by the application. In an embodiment, registration interface 108a, as illustrate in FIG. 2, generates a CSR.

Logic block 604 illustrates outputting registration information, such as at least user credentials and a CSR, from the first application to the server, such as server 101 illustrated in FIGS. 1 and 2.

Logic block 605 illustrates receiving information that indicates that the first application has access to the server. In an embodiment, the information that indicates the first application has access to the server includes a signed certificate and device-identifier. The signed certificate may be stored in shared storage, such as shared storage 202 illustrated in FIG. 2. In an embodiment, a user is notified that the first application is registered.

In an embodiment, logic block 605 also illustrates an application requesting access and refresh tokens from a server. The received access and refresh tokens are stored in an associated private storage, such as private storage 203.

Logic block 606 illustrates a first application receiving first information, such as a first service, from the server. In an embodiment, a first application calls a first API that enables a requested first service or first information from the server to be provided to the first application.

Logic block 607 illustrates a second application requesting second information, or a second service, from the server. The second application does not prompt a user for user credentials or registration information and uses at least information that indicates the first application has access to the server. For example, the second application may use at least the stored signed certificate for the server in requesting information or a service as detailed herein. The signed certificate and device-identifier is stored by a first application, such as application 108, in shared storage, such as shared storage 202, and then may be retrieved by a second application, such as application 109, in attempting to retrieve second information from the server.

In an embodiment, logic block 607 also illustrates a second application retrieving access and refresh tokens from private storage or the server.

Logic block 608 illustrates the second application receiving second information, such as a second service, from the server. In an embodiment, a second application calls a second API that enables a requested second service or second information from the server to be provided to the second application.

Figure 7A:
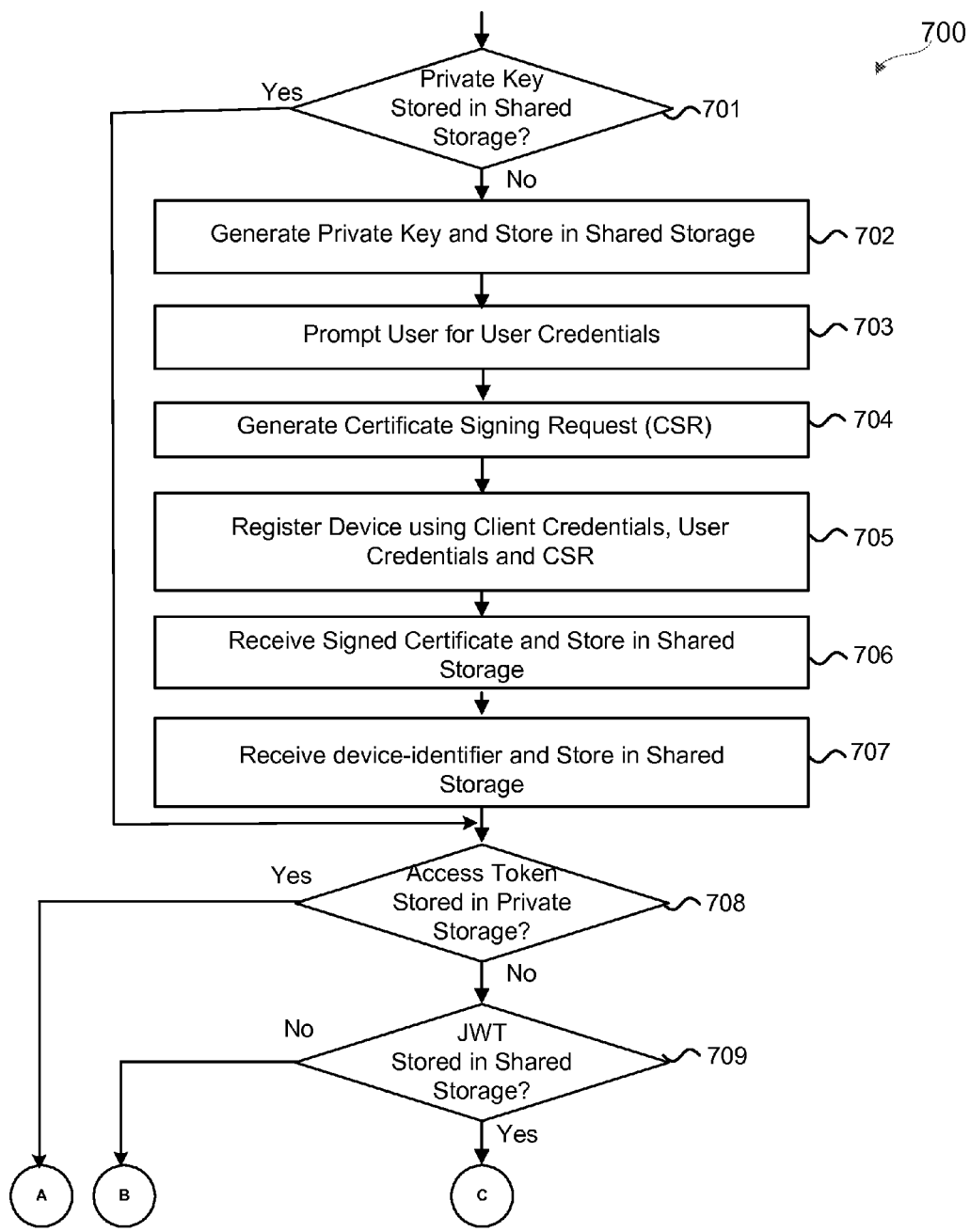
FIGS. 7A-B is a flowchart illustrating a protocol using an operation of a register interface in an application according to an embodiment.
Figure 7B:
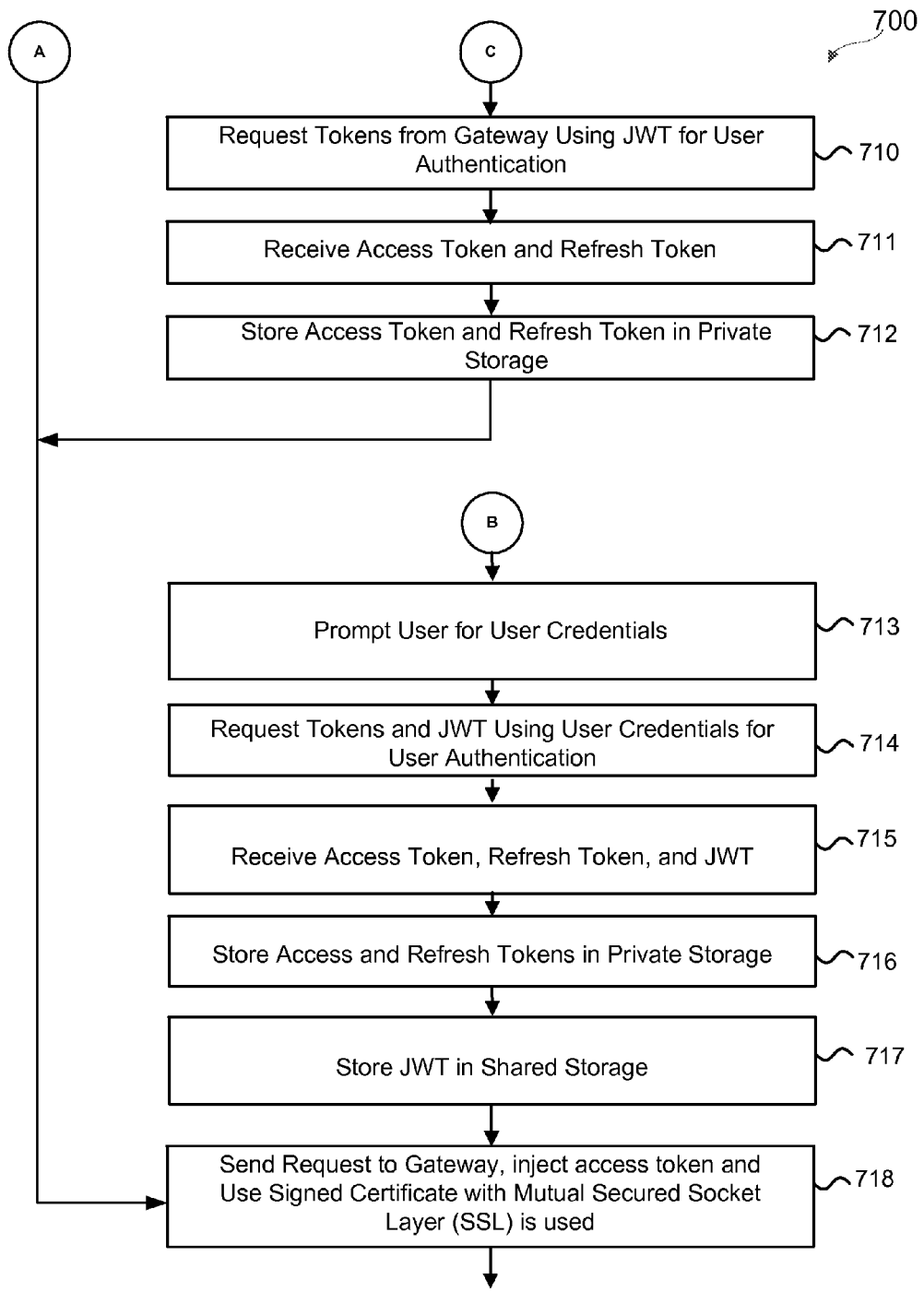

FIGS. 7A-B is a flowchart describing operation of a register interface, such as registration interface 108a in application 108 shown in FIG. 2. In particular, FIGS. 7A-B illustrate a register interface performing at least a portion of a protocol to register a user, device and/or application with a server.

When an application request a resource, a registration interface determines whether a private key is available or stored in shared storage as illustrated by logic block 701. When a private key is available, control transfers to logic block 708. Otherwise, control transfers to logic block 702.

Logic block 702 illustrates a register interface generating a private key and storing the generated private key in shared storage, such as shared storage 202 shown in FIG. 2.

Logic block 703 then illustrates a register interface causing application 108 (along with a user interface, such as user interface 110) to prompt a user for user credentials.

A CSR is then generated by a register interface as illustrated by logic block 704.

Registration interface then registers a device by sending client credentials, user credentials and a CSR to a targeted server as illustrated in logic block 705.

Registration interface receives a signed certificate from a server when the client and user credentials have been validated by the server as illustrated by logic block 706. The received signed certificate is also stored in shared storage as illustrated by logic block 706 and may be used by other applications.

Registration interface also receives a device-identifier from the server and stores the device-identifier in shared storage as illustrated in logic block 707.

Logic block 708 determines whether an access token is available or stored in private storage, such as private storage 203. When an access token is stored, control transfers to logic block 718. Otherwise, control transfers to logic block 709

Logic block 709 determines whether a JWT is available or stored in shared storage, such as shared storage 202. When a JWT is not stored, control transfers to logic block 713. Otherwise, control passes logic block 710.

Logic block 710 illustrates requesting tokens from a server, such as a gateway executed on a server. In an embodiment, JWT is used for user authentication rather than prompting a user for user credentials.

When a user is authenticated, registration interface receives and access token and refresh token from a server for a session with the server as illustrated by logic block 711.

Logic block 712 illustrates storing the received access token and refresh token in private storage, such as access token 203a and refresh token 203b in private storage 203.

When a JWT is not stored in shared storage, a registration interface initiates the application to prompt the user for user credentials as illustrated in logic block 713.

Access token, refresh token and JWT are requested from a server while user credentials are used for user authentication as illustrated in logic block 714.

Logic block 715 illustrates receiving an access token, refresh token and JWT from a server after authentication.

Logic block 716 illustrates storing received access and refresh tokens in private storage, such as private storage 203.

Logic block 717 illustrates storing received JWT in shared storage, such as shared storage 202.

Logic block 718 illustrates sending a request for service to a gateway (or using an API), injecting an access token and using a signed certificate when mutual secured socket layer (SSL) is used.

Figure 8:
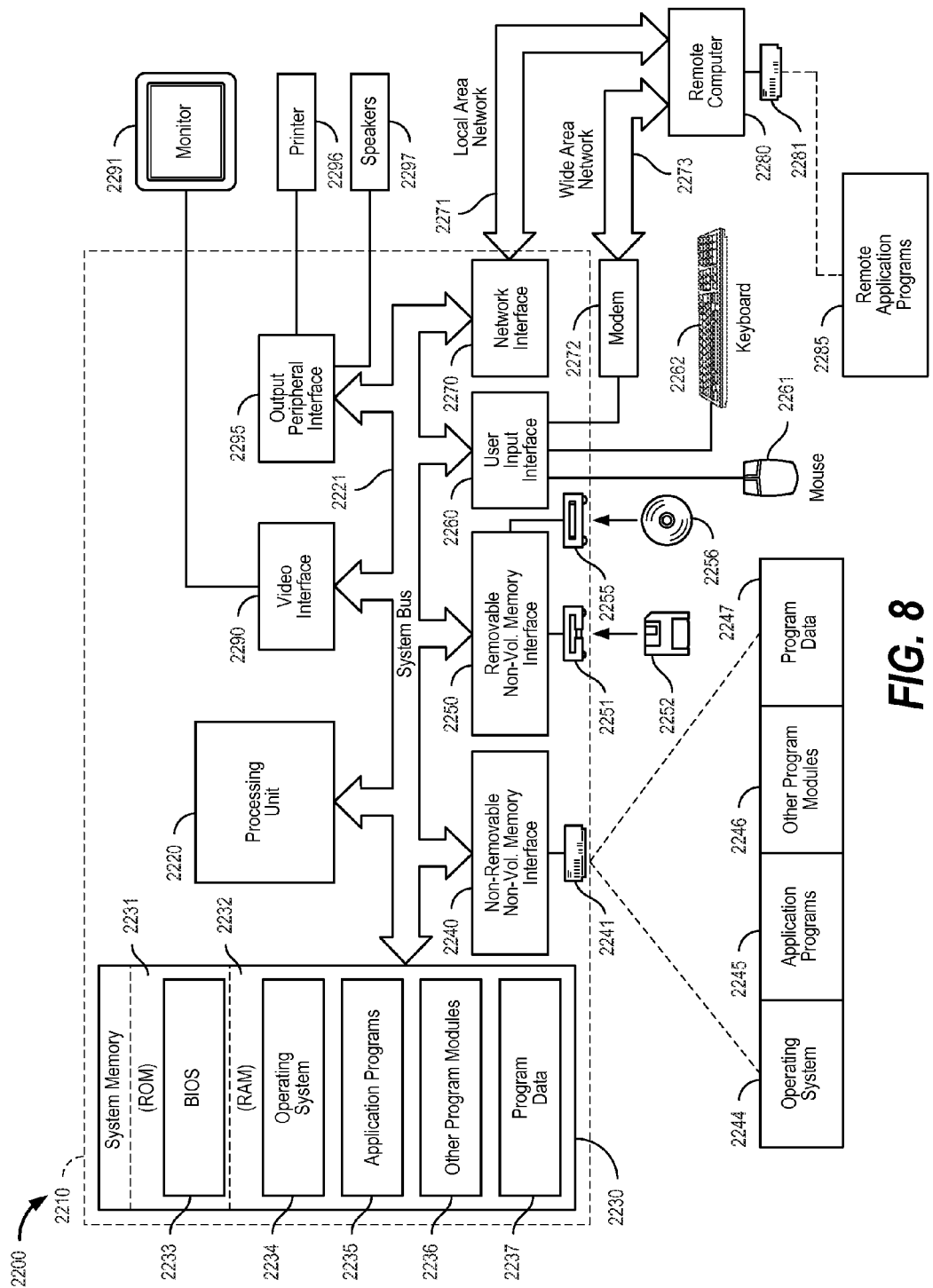
FIG. 8 is a block diagram of a computing device environment according to an embodiment.

The disclosed technology may be used with various computing systems or computing devices. FIG. 8 is a block diagram of an embodiment of a system environment 2200. Computing system environment 2200 includes a general purpose computing device in the form of a computer 2210. In an embodiment, mobile computing devices 107 and/or computing device 111 shown in FIG. 1 correspond to computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application programs 2235, other program modules 2236, and program data 2237. In an embodiment, computer program code as described herein may be at least partially stored in application programs 2235.

The computer 2210 may also include other removable/non-removable, volatile/nonvolatile computer storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media described above provide storage of computer readable instructions, data structures, program modules and other data for the computer 2210. Hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. In an embodiment, Applications 108-109 and 112-113 shown FIG. 1 correspond to application programs 2245 and user interfaces 110 and 111 shown in FIG. 1 correspond to operating system 2244. In an embodiment, user interfaces 110 and 111 are natural language interfaces and/or touch surfaces for user speech, touch or gesture input and output.

A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210. In an embodiment, computing devices 101 and/or 102 shown in FIG. 1 correspond to remote computer 2280. Similarly, gateway 101b and/or registration 101c may be stored and/or executed in remote computer 2280 in an embodiment. The logical connections may include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application programs 2285 may reside on memory device 2281. In an embodiment gateway 101b and application server 101a correspond to remote application programs 2285. It will be appreciated that the network connections shown are exemplary and other means of establishing a communications link between the computers may be used.

The flowchart, sequence diagrams and block diagrams in the Figures illustrate the architecture, functionality, and operation of possible implementations of systems, methods and computer program products according to various aspects of the present disclosure. In this regard, each block in the flowchart or block diagram (or arrow in sequence diagram) may represent a module, segment, or portion of code, which comprises one or more executable instructions for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block of the block diagrams or arrows and/or flowchart illustration, and combinations of blocks in the block diagrams or arrows and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for registering a first and second application stored on a computing device with a server, the method comprising:
    outputting registration information for the first application from the computing device to the server, the registration information comprising information to access the server;
    receiving a signed certificate that indicates that the first application is registered with the server in response to outputting the registration information;
    requesting access to a first resource on the server, by the first application, from the server upon verification that the signed certificate is received;
    receiving the first resource, by the first application, from the server;
    requesting access to a second resource on the server, by the second application, from the server using the signed certificate;
    receiving the second resource, by the second application, without outputting registration information for the second application to the server;
    outputting a request for one or more tokens from the server after receipt of the signed certificate by the computing device; and
    receiving the one or more tokens from the server.

2. The method of claim 1, wherein the registration information for the first application comprises a user name, password and device name.

3. The method of claim 1, further comprising prompting a user for the registration information for the first application and not prompting the user for the registration information for the second application.

4. The method of claim 1, further comprising:
    determining whether the signed is available before outputting the registration information for the first application.

5. The method of claim 1 further comprising:
    generating a private key; and
    generating a certificate signing request, wherein the registration information outputted by the computing device for the first application comprises a username, a password, a client-identifier, a client secret, a device-identifier, a device name and the certificate signing request.

6. The method of claim 5, further comprising receiving the device-identifier with the signed certificate from the server.

7. The method of claim 6, wherein outputting a request for one or more tokens and receiving the one or more tokens comprise the steps of outputting a request for an access token, refresh token and JSON Web Token (JWT) from the server after receipt of the device-identifier and signed certificate by the computing device; and
    receiving the access token, refresh token and JWT from the server.

8. The method of claim 7, further comprising:
    storing the access token and refresh token in a private key ring for the first application; and
    storing the JWT in a shared key ring for the first and second applications.

9. An apparatus comprising:
    a processor; and
    a computer readable storage medium to store a first application having computer readable program code and a second application having computer readable program code,
    wherein the processor executes the computer readable program code of the first and second applications to:
        prompt a user for registration information;
        receive the registration information from the user;
        provide a request to register the first application with a server computing device, the request including the registration information;
        receive an indication that the first application is registered with the server computing device;
        store the indication in a memory shared by the first application and the second application;
        request a first resource on the server, by the first application, from the server computing device;
        receive the first resource, by the first application, from the server computing device;
        request a second resource on the server, by the second application, from the server computing device using the indication stored in the memory shared by the first and second applications;
        receive the second resource, by the second application, from the server computing device;
        outputting a request for one or more tokens from the server; and
        receiving the one or more tokens from the server.

10. The apparatus of claim 9, wherein the computer readable storage medium further stores a shared set of encryption information comprising a signed certificate that is included in the indication that the first application is registered, the shared set of encryption information is accessible from the first and second applications.

11. The apparatus of claim 10, wherein the processor executes the computer readable program code of the first and second applications to further request an access token, refresh token and JWT from the server computing device.

12. The apparatus of claim 11, wherein the computer readable storage medium stores a first and second set of private encryption information associated with the first and second applications, wherein the access token and refresh token are received from the server computing device and stored in the first set of private encryption information when the processor executes the computer readable program code of the first application.

13. The apparatus of claim 12, wherein the computer readable storage medium stores a shared set of encryption information associated with the first and second applications, wherein the first application receives the JWT from the server and stores the JWT in the shared set of encryption information that is accessible by the second application.

14. The apparatus of claim 12, wherein the apparatus is a mobile computing device that accesses the server computing device via a network.

15. A computer program product, comprising:
a computer readable storage medium having computer readable program code embodied therewith, the computer readable program code comprising:
computer readable program code configured to provide a first application;
computer readable program code configured to provide a second application;
computer readable program code configured to provide a first private key chain for the first application;
computer readable program code configured to provide a shared key chain for the first and second applications, wherein the computer readable program code for the first application generates a private key and a certificate signing request, the computer readable program code for the first application outputs the certificate signing request to a server, the computer readable program code for the first application then receives and stores a signed certificate and a device-identifier in the computer readable program code configured to provide the shared key chain;
computer readable code configured to provide a second private key chain and the signed certificate for use by the second application in accessing resources from the server;
wherein the computer readable program code configured to provide the first application is further configured to request an access token, refresh token and JSON Web Token (JWT) from the server;
wherein the computer readable program code configured to provide the first application is further configured to store the access token and refresh token in the computer readable program code to provide the first private key chain, and to store JWT in the computer readable program code to provide the shared key chain; and
wherein the computer readable program code configured to provide the second application does not prompt the user for registration information before accessing information from the server.

16. The computer program product of claim 15, wherein the computer readable program code configured to provide the first application prompts a user for registration information.

17. The computer program product of claim 16, wherein the computer readable program code configured to provide the second application uses the JWT stored in the computer readable program code to provide the shared key chain when requesting a service from the server.

18. The computer program product of claim 15, wherein the computer readable storage medium is embodied in a mobile computing device.

* * * * *